US009230606B2

(12) United States Patent
Ding et al.

(10) Patent No.: US 9,230,606 B2
(45) Date of Patent: Jan. 5, 2016

(54) MOUNTING APPARATUS ASSEMBLY

(71) Applicant: Zhongshan Innocloud Intellectual Property Services Co., Ltd., Zhongshan (CN)

(72) Inventors: Lin Ding, Wuhan (CN); Yu-Ming Xiao, Wuhan (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 80 days.

(21) Appl. No.: 14/220,337

(22) Filed: Mar. 20, 2014

(65) Prior Publication Data

US 2015/0022964 A1 Jan. 22, 2015

(30) Foreign Application Priority Data

Jul. 17, 2013 (CN) ........................ 2013 1 02989057

(51) Int. Cl.
*G11B 33/02* (2006.01)

(52) U.S. Cl.
CPC .............. *G11B 33/02* (2013.01); *G11B 33/022* (2013.01)

(58) Field of Classification Search
CPC ..................... G11B 2220/2516; G11B 33/128; G11B 33/124; G06F 1/187; G06F 1/184; G06F 1/181
See application file for complete search history.

(56) References Cited

U.S. PATENT DOCUMENTS 5,325,263 A * 6/1994 Singer ..................... G06F 1/184 361/679.39
5,588,728 A * 12/1996 Eldridge .............. G11B 33/025 312/223.1
5,641,296 A * 6/1997 Larabell .................. G06F 1/184 439/157
6,193,532 B1 * 2/2001 Smithson ............. H05K 7/1411 439/157
6,404,641 B1 * 6/2002 Fisk ........................ G06F 1/184 312/332.1
6,625,014 B1 * 9/2003 Tucker .................... G06F 1/184 312/223.1
7,090,528 B2 * 8/2006 Tuttle ................... G11B 33/122 361/679.33
7,344,394 B1 * 3/2008 Barina .................... G06F 1/183 361/755
7,830,656 B2 * 11/2010 Ding ....................... G06F 1/187 361/679.37
8,432,670 B2 * 4/2013 Chen .................... G11B 33/124 361/679.02
8,526,191 B2 * 9/2013 Peng .................... G11B 33/124 206/701
8,807,488 B2 * 8/2014 Lee ......................... G06F 1/187 248/222.51
9,030,819 B2 * 5/2015 He ........................... H05K 7/14 248/222.51
9,122,458 B2 * 9/2015 Yu ........................... G06F 1/185
2003/0156890 A1 * 8/2003 Tucker ................... F16M 11/06 403/53
2005/0051672 A1 * 3/2005 Dean ....................... G06F 1/184 248/27.1
2006/0171110 A1 * 8/2006 Li ........................... G06F 1/184 361/679.37
2007/0014085 A1 * 1/2007 Meserth .................. G06F 1/184 361/679.35
2008/0074018 A1 * 3/2008 Wu ...................... G11B 33/128 312/223.2
2009/0225527 A1 * 9/2009 Olesiewicz ........ H05K 7/20727 361/802
2009/0273901 A1 * 11/2009 Jaramillo ............. H05K 7/1492 361/679.58
2011/0267766 A1 * 11/2011 Wu ......................... G06F 1/187 361/679.37
2011/0289521 A1 * 11/2011 Chen .................... G11B 33/124 720/601
2012/0056515 A1 * 3/2012 Chen .................... H05K 7/1487 312/223.2
2012/0087084 A1 * 4/2012 Nguyen .............. G11B 33/124 361/679.37
2012/0243167 A1 * 9/2012 Chen ......................... G06F 1/87 361/679.31
2013/0163182 A1 * 6/2013 Guo ........................ G06F 1/187 361/679.33
2013/0229766 A1 * 9/2013 Williams .................. G06F 1/16 361/679.33

* cited by examiner

*Primary Examiner* — Hoa C Nguyen
*Assistant Examiner* — Xanthia C Cunningham
(74) *Attorney, Agent, or Firm* — Novak Druce Connolly Bove + Quigg LLP

(57) ABSTRACT

A mounting apparatus includes a bracket and a pivoting member. A first sliding slot, a second sliding slot, a first guiding slot and a locating hole are defined in the bracket. A pivoting hole, a first guiding portion, a second guiding portion and a resisting wall are located on the pivoting member. A locating block is positioned on the resisting wall. A fastening member and a pivoting portion are configured to be positioned on a hard disc drive. The pivoting portion is passed through the pivoting hole, the first guiding portion is slid in a second guiding slot in the hard disc drive, the fastening member is slid in the first sliding slot. The pivoting portion is slid in the second sliding slot, the second guiding portion is slid in the first guiding slot, the resisting wall is rotated until the locating block is locked in the locating hole.

20 Claims, 4 Drawing Sheets

MOUNTING APPARATUS ASSEMBLY

BACKGROUND

1. Technical Field

The present disclosure relates to a mounting apparatus assembly.

2. Description of Related Art

Conventional hard disc drives are fixed to a bracket of a computer case by rivets or screws. Fixing the hard disc drives to the bracket may be laborious and time consuming.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
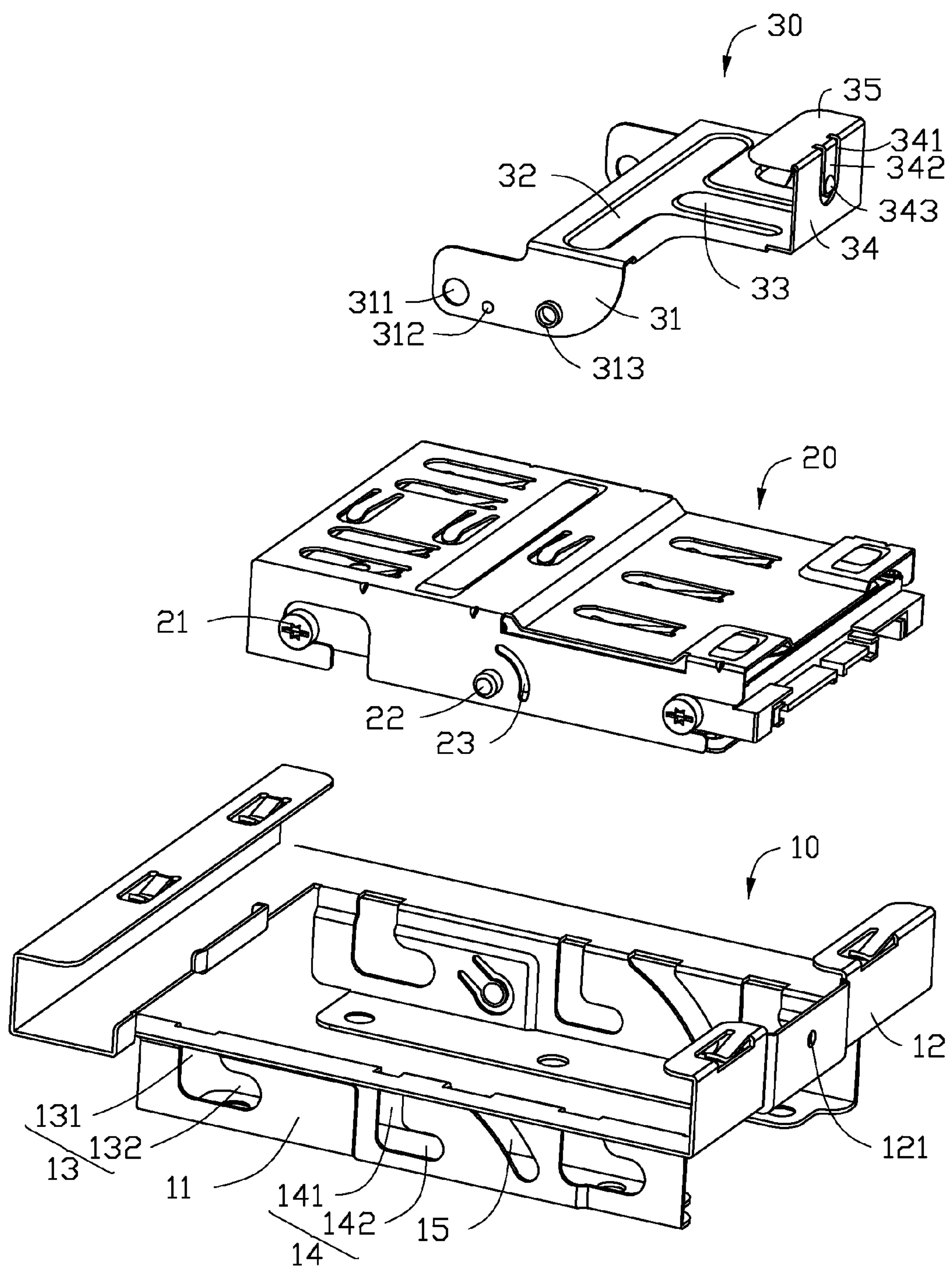
FIG. 1 is an exploded view of an embodiment of a mounting apparatus assembly.
Figure 2:
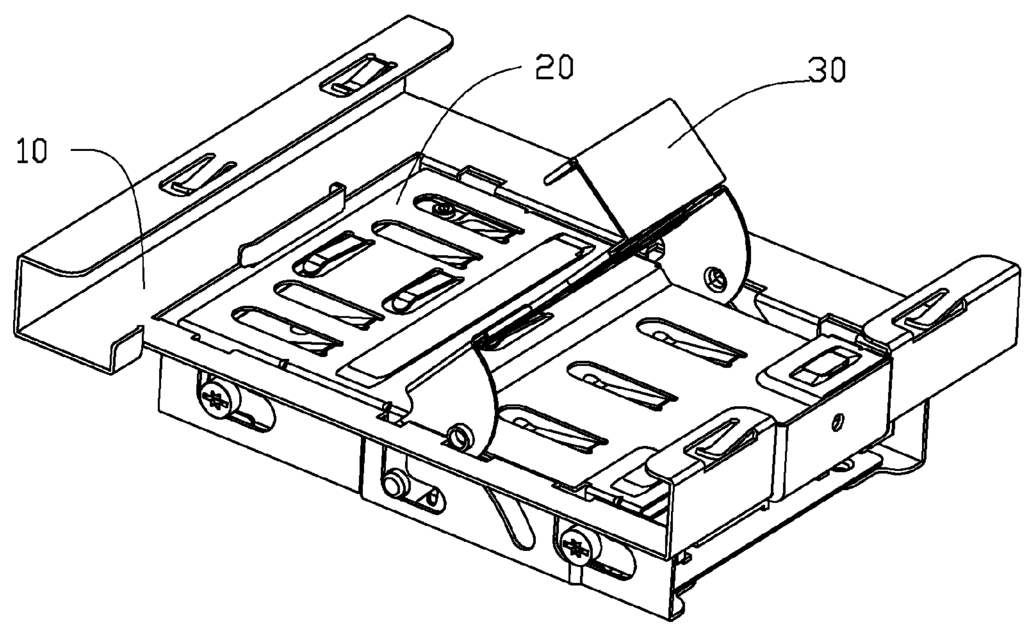
FIG. 2 is an assembled view of the mounting apparatus assembly of FIG. 1.
Figure 3:
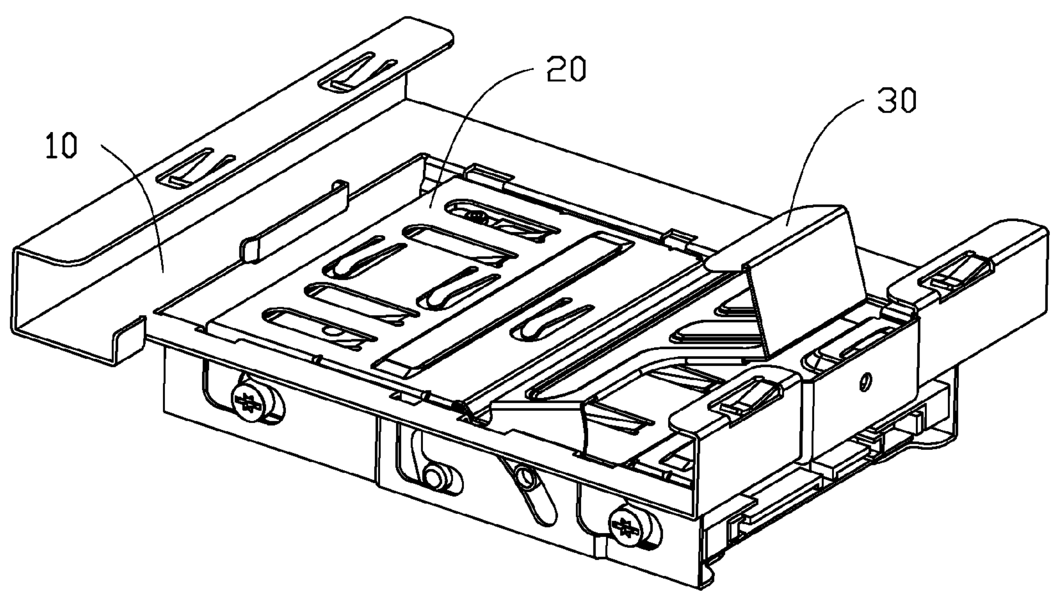
FIG. 3 is an isometric view of the mounting apparatus assembly of FIG. 2, in one working state.
Figure 4:
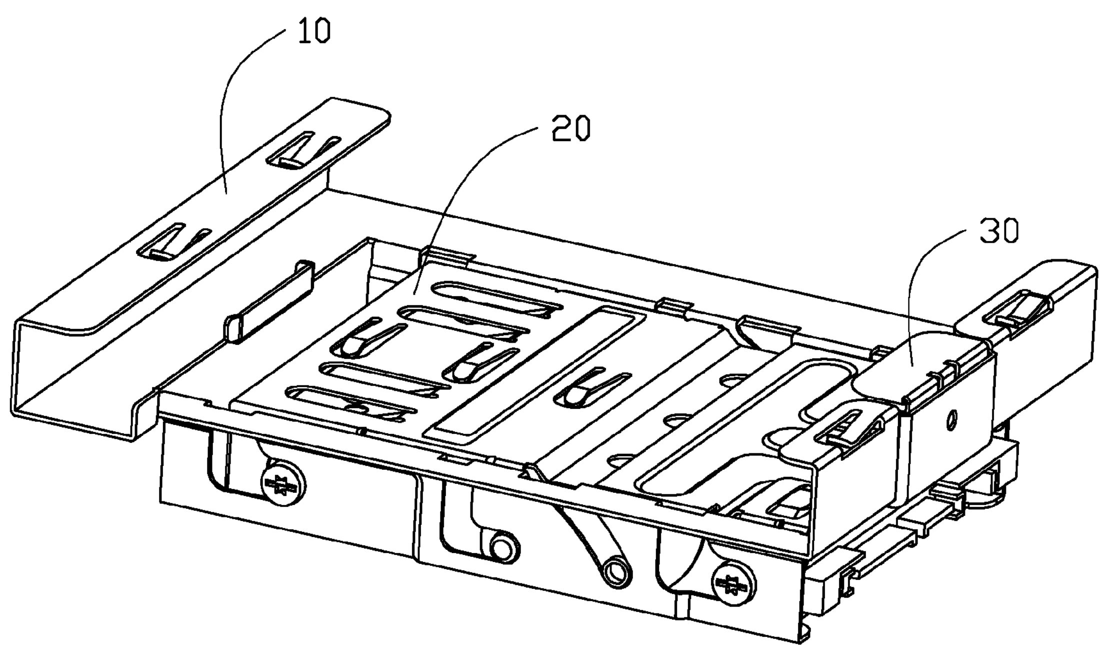
FIG. 4 is an isometric view of the mounting apparatus assembly of FIG. 2, in another working state.

FIG. 1 shows a mounting apparatus assembly of the embodiment. The mounting apparatus assembly includes a bracket 10 for slidably receiving a hard disc drive 20. A pivoting member 30 is pivotally mounted to the hard disc drive 20.

The bracket 10 includes two side plates 11 and a connecting plate 12 connected to the two side plates 11. Two first sliding slots 13, a second sliding slot 14 and a first guiding slot 15 are defined in each of the two side plates 11. Each of the two first sliding slots 13 includes a first inserting portion 131 and a first sliding portion 132 communicating with the first inserting portion 131. The second sliding slot 14 includes a second inserting portion 141 and a second sliding portion 142 communicating with the second inserting portion 141. A locating hole 121 is defined in the connecting plate 12.

In one embodiment, the two side plates 11 are substantially parallel to each other. The first inserting portion 131 is substantially perpendicular to the first sliding portion 132. The second inserting portion 141 is substantially perpendicular to the second sliding portion 142. The second sliding slot 14 and the first guiding slot 15 are located between the two first sliding slots 13 on each of the two side plates 11. A width of the first inserting portion 131 is substantially greater than a width of the first sliding portion 132. A width of the second inserting portion 141 is substantially greater than a width of the second sliding portion 142. The first guiding slot 15 is substantially arc-shaped.

Two fastening members 21 and a pivoting portion 22 are positioned on each of the two sides of the hard disc drive 20. A second guiding slot 23 is defined in each of the two sides of the hard disc drive 20. In one embodiment, the pivoting portion 22 and the second guiding slot 23 are located between the two fastening members 21 on each of the two fastening members 21. A diameter of each of the two fastening members 21 is substantially equal to a width of the first sliding portion 132. A diameter of the pivoting portion 22 is substantially equal to a width of the second sliding portion 142. The second guiding slot 23 is substantially arc-shaped. The two fastening members 21 and the pivoting portion 22 are substantially rounded.

The pivoting member 30 includes two sidewalls 31 and a first connecting wall 32 connected to the two sidewalls 31. A second connecting wall 33 substantially horizontally extends from a middle of the first connecting wall 32. A resisting wall 34 substantially perpendicularly extends from a distal end of the second connecting wall 33. An operating wall 35 substantially horizontally extends from a top edge of the resisting wall 34.

A pivoting hole 311 is defined in each of the two sidewalls 31. A first guiding portion 312 and a second guiding portion 313 are positioned on each of the two sidewalls 31. In one embodiment, the first guiding portion 312 is located on each of the two sidewalls 31 between the pivoting hole 311 and the second guiding portion 313. An extending direction of the first guiding portion 312 is substantially opposite to an extending direction of the second guiding portion 313 on each of the two sidewalls 31.

In one embodiment, a diameter of the pivoting hole 311 is substantially equal to a diameter of the pivoting portion 22. A diameter of the first guiding portion 312 is substantially equal to a width of the second guiding slot 23. A diameter of the second guiding portion 313 is substantially equal to a width of the first guiding slot 15. The pivoting hole 311 is substantially rounded. The first guiding portion 312 is substantially arc-shaped. The second guiding portion 313 is substantially ring-shaped.

An opening 341 is defined in the resisting wall 34. A resisting tab 342 extends in the opening 341 from the operating wall 35 to the resisting wall 34. A locating block 343 protrudes on the resisting tab 342. In one embodiment, the resisting tab 342 is elastically deformable. The locating block 343 is sphere-shaped. A diameter of the locating block 343 is substantially equal to a diameter of the locating hole 121.

FIGS. 1 to 4 show that in assembly, the pivoting member 30 is moved toward the hard disc drive 20. The pivoting portions 22 on two sides of the hard disc drive 20 pass through the pivoting holes 311 in the two sidewalls 31 respectively. The first guiding portion 312 is slid in the corresponding second guiding slot 23. The pivoting member 30 is pivotally mounted to the hard disc drive 20.

When the hard disc drive 20 is attached to the bracket 10, the assembled hard disc drive 20 and the pivoting member 30 are moved toward the bracket 10. The two fastening members 21 on each of the two sides of the hard disc drive 20 are slid in the two first inserting portions 131 on each of the two side plates 11 respectively. The pivoting portion 22 is slid in the corresponding second inserting portion 141. The second guiding portion 313 is slid in the corresponding first guiding slot 15.

The operating wall 35 is pulled to move the hard disc drive 20 in a horizontal direction. The fastening member 21 is slid in the corresponding first sliding portion 132. The pivoting portion 22 is slid in the corresponding second sliding portion 142. The operating wall 35 is rotated toward the connecting plate 12 around the pivoting portion 22. The first guiding portion 312 is slid in the corresponding second guiding slot 23 continuously. The second guiding portion 313 is slid in the corresponding first guiding slot 15 continuously.

The operating wall 35 is rotated around the pivoting portion 22 until the locating block 343 of the pivoting member 30 resists against the connecting plate 12 of the bracket 10. The resisting tab 342 is elastically deformed. The locating block 343 is locked in the locating hole 121 in the connecting plate 12. The hard disc drive 20 is mounted to the bracket 10. The first guiding portion 312 is located at a bottom of the corresponding second guiding slot 23. The second guiding portion 313 is located at a bottom of the corresponding first guiding slot 15.

When the hard disc drive 20 is detached from the bracket 10, the operating wall 35 is pushed to move the resisting tab 342 away from the connecting plate 12. When the locating block 343 disengages from the locating hole 121, the operating wall 35 is rotated away from the connecting plate 12 around the pivoting portion 22. The first guiding portion 312 is slid out of the corresponding second guiding slot 23. The second guiding portion 313 is slid out of the corresponding first guiding slot 15.

The operating wall 35 is pushed to move the hard disc drive 20 in the horizontal direction. The fastening member 21 is slid in the corresponding first inserting portion 131 from the first sliding portion 132. The pivoting portion 22 is slid in the corresponding second inserting portion 141 from the second sliding portion 142. The operating wall 35 is lifted up together with the hard disc drive 20 away from the bracket 10. The fastening member 21 is slid out of the corresponding first inserting portion 131. The pivoting portion 22 is slid out of the corresponding second inserting portion 141. The hard disc drive 20 is detached from the bracket 10.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A mounting apparatus, comprising:

a bracket comprising two side plates and a connecting plate connected to each of the two side plates; a first sliding slot, a second sliding slot and a first guiding slot defined in each of the two side plates; a locating hole defined in the connecting plate; and a pivoting member configured to be pivotally mounted to a hard disc drive; a pivoting hole defined in the pivoting member; a first guiding portion, a second guiding portion and a resisting wall positioned on the pivoting member; a locating block positioned on the resisting wall; a fastening member and a pivoting portion configured to be positioned on each of two sides of the hard disc drive; wherein when the pivoting portion is passed through the pivoting hole, the first guiding portion is slid in a second guiding slot in each side of the hard disc drive, the fastening member is slid in the first sliding slot, the pivoting portion is slid in the second sliding slot, the second guiding portion is slid in the first guiding slot, and the resisting wall is rotated toward the connecting plate until the locating block is locked in the locating hole.

2. The mounting apparatus of claim 1, wherein the first sliding slot comprises a first inserting portion and a first sliding portion communicated with the first inserting portion; the second sliding slot comprises a second inserting portion and a second sliding portion communicated with the second inserting portion; the fastening member is slid in the first sliding portion from the first inserting portion; and the pivoting portion is slid in the second sliding portion from the second inserting portion.

3. The mounting apparatus of claim 2, wherein a width of the first inserting portion is substantially greater than a width of the first sliding portion; and a width of the second inserting portion is substantially greater than a width of the second sliding portion.

4. The mounting apparatus of claim 3, wherein a diameter of fastening member is substantially equal to a width of the first sliding portion; and a diameter of the pivoting portion is substantially equal to a width of the second sliding portion.

5. The mounting apparatus of claim 4, wherein the first guiding slot and the second guiding slot are substantially arc-shaped.

6. The mounting apparatus of claim 1, wherein the pivoting member comprises two sidewalls and a first connecting wall connected to each of the two sidewalls; a second connecting wall extends from the first connecting wall; the resisting wall extends from the second connecting wall; and an operating wall extends from the resisting wall.

7. The mounting apparatus of claim 1, wherein a diameter of the pivoting hole is substantially equal to a diameter of the pivoting portion; a diameter of the first guiding portion is substantially equal to a width of the second guiding slot; and a diameter of the second guiding portion is substantially equal to a width of the first guiding slot.

8. The mounting apparatus of claim 6, wherein the first guiding portion is located on each of the two sidewalls between the pivoting hole and the second guiding portion; and an extending direction of the first guiding portion is substantially opposite to an extending direction of the second guiding portion on each of the two sidewalls.

9. The mounting apparatus of claim 6, further comprising an opening defined in the resisting wall; a resisting tab extends in the opening from the operating wall to the resisting wall; and the locating block protrudes on the resisting tab.

10. The mounting apparatus of claim 9, wherein a diameter of the locating block is substantially equal to a diameter of the locating hole; the resisting tab is elastically deformable; and the locating block is sphere-shaped.

11. A mounting apparatus assembly, comprising:

a bracket comprising two side plates and a connecting plate connected to each of the two side plates; a first sliding slot, a second sliding slot and a first guiding slot are defined in each of the two side plates; a locating hole is defined in the connecting plate;

a hard disc drive comprising a fastening member and a pivoting portion configured to be positioned on each of two sides of the hard disc drive, and a second guiding slot defined in each of two sides of the hard disc drive; and a pivoting member configured to be pivotally mounted to the hard disc drive; a pivoting hole is defined in the pivoting member; a first guiding portion, a second guiding portion and a resisting wall are positioned on the pivoting member; a locating block is positioned on the resisting wall; wherein when the pivoting portion is passed through the pivoting hole, the first guiding portion is slid in the second guiding slot, the fastening member is slid in the first sliding slot, the pivoting portion is slid in the second sliding slot, the second guiding portion is slid in the first guiding slot, and the resisting wall is rotated toward the connecting plate until the locating block is locked in the locating hole.

12. The mounting apparatus assembly of claim 11, wherein the first sliding slot comprises a first inserting portion and a first sliding portion communicated with the first inserting portion; the second sliding slot comprises a second inserting portion and a second sliding portion communicated with the second inserting portion; the fastening member is slid in the first sliding portion from the first inserting portion; and the pivoting portion is slid in the second sliding portion from the second inserting portion.

13. The mounting apparatus assembly of claim 12, wherein a width of the first inserting portion is substantially greater than a width of the first sliding portion; and a width of the second inserting portion is substantially greater than a width of the second sliding portion.

14. The mounting apparatus assembly of claim 13, wherein a diameter of fastening member is substantially equal to a width of the first sliding portion; and a diameter of the pivoting portion is substantially equal to a width of the second sliding portion.

15. The mounting apparatus assembly of claim 14, wherein the first guiding slot and the second guiding slot are substantially arc-shaped.

16. The mounting apparatus assembly of claim 11, wherein the pivoting member comprises two sidewalls and a first connecting wall connected to each of the two sidewalls; a second connecting wall extends from the first connecting wall; the resisting wall extends from the second connecting wall; and an operating wall extends from the resisting wall.

17. The mounting apparatus assembly of claim 11, wherein a diameter of the pivoting hole is substantially equal to a diameter of the pivoting portion; a diameter of the first guiding portion is substantially equal to a width of the second guiding slot; and a diameter of the second guiding portion is substantially equal to a width of the first guiding slot.

18. The mounting apparatus assembly of claim 16, wherein the first guiding portion is located on each of the two sidewalls between the pivoting hole and the second guiding portion; and an extending direction of the first guiding portion is substantially opposite to an extending direction of the second guiding portion on each of the two sidewalls.

19. The mounting apparatus assembly of claim 16, further comprising an opening defined in the resisting wall; a resisting tab extends in the opening from the operating wall to the resisting wall; and the locating block protrudes on the resisting tab.

20. The mounting apparatus assembly of claim 19, wherein a diameter of the locating block is substantially equal to a diameter of the locating hole; the resisting tab is elastically deformable; and the locating block is sphere-shaped.

* * * * *